(12) United States Patent
Lee et al.

(10) Patent No.: US 12,308,690 B2
(45) Date of Patent: May 20, 2025

(54) ELECTRONIC DEVICE AND CONTROL METHOD THEREFOR

(71) Applicant: Samsung Electronics Co., Ltd., Suwon-si (KR)

(72) Inventors: Jaesung Lee, Suwon-si (KR); Jungsu Park, Suwon-si (KR); Jongchul Hong, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 34 days.

(21) Appl. No.: 18/448,484

(22) Filed: Aug. 11, 2023

(65) Prior Publication Data

US 2023/0387711 A1 Nov. 30, 2023

Related U.S. Application Data

(63) Continuation of application No. PCT/KR2022/000137, filed on Jan. 5, 2022.

(30) Foreign Application Priority Data

Mar. 2, 2021 (KR) .................. 10-2021-0027294

(51) Int. Cl.
*H02J 7/00* (2006.01)
*H02J 50/10* (2016.01)
*H04B 5/79* (2024.01)

(52) U.S. Cl.
CPC ...... *H02J 7/007194* (2020.01); *H02J 7/0049* (2020.01); *H02J 50/10* (2016.02); *H04B 5/79* (2024.01)

(58) Field of Classification Search
CPC .................................. H02J 7/007194
(Continued)

(56) References Cited

U.S. PATENT DOCUMENTS 7,449,862 B1 11/2008 Voor et al.
8,159,194 B2 4/2012 Mori et al.
(Continued)

FOREIGN PATENT DOCUMENTS

JP 2009-254108 A 10/2009
JP 2018-027017 A 2/2018
(Continued)

OTHER PUBLICATIONS

International Search Report dated Apr. 21, 2022, issued in International Patent Application No. PCT/KR2022/000137.

*Primary Examiner* — Joseph Chang
(74) *Attorney, Agent, or Firm* — Jefferson IP Law, LLP

(57) ABSTRACT

An electronic device is provided. The electronic device includes a battery, a sensor module for acquiring a first temperature, which is the temperature of a first portion adjacent to the battery, a power reception unit for wirelessly receiving power from a charging device, a power management module for supplying power to the battery and an internal system of the electronic device, and a processor electrically connected to the sensor module and the power management module, wherein, while the electronic device wirelessly receives power from the charging device, the processor is configured to transmit a first command to the power management module so the power management module cut offs the supply of the power to the battery and supplies the power to the internal system in response to the battery being fully charged, use the sensor module to acquire a second temperature, and control the power, supplied to the internal system.

16 Claims, 7 Drawing Sheets

(58) Field of Classification Search
USPC .......................................................... 307/31
See application file for complete search history.

(56) References Cited

U.S. PATENT DOCUMENTS

| | | |
|---|---|---|
| 9,356,459 B2 | 5/2016 | Chung |
| 9,923,403 B2 | 3/2018 | Chung et al. |
| 10,003,207 B2 | 6/2018 | Jung et al. |
| 10,468,905 B2 | 11/2019 | Kim et al. |
| 10,498,179 B2 | 12/2019 | Shichino |
| 10,673,270 B2 | 6/2020 | Chung et al. |
| 10,797,509 B2 | 10/2020 | Kim et al. |
| 11,063,418 B2 | 7/2021 | Govindaraj |
| 11,411,432 B2 | 8/2022 | Lee et al. |
| 2009/0251107 A1* | 10/2009 | Mori ............... H02J 7/0031 320/150 |
| 2012/0161695 A1 | 6/2012 | Mori et al. |
| 2013/0093385 A1* | 4/2013 | Patino ............ H02J 7/007194 320/108 |
| 2014/0002008 A1 | 1/2014 | Chung |
| 2016/0064958 A1* | 3/2016 | Jung ............... H02J 7/007192 320/134 |
| 2018/0076672 A1 | 3/2018 | Shichino |
| 2019/0326743 A1 | 10/2019 | Govindaraj |
| 2020/0067342 A1 | 2/2020 | Kim et al. |
| 2020/0251932 A1 | 8/2020 | Chung et al. |
| 2020/0313460 A1 | 10/2020 | Lee et al. |
| 2022/0026494 A1 | 1/2022 | Lee et al. |

FOREIGN PATENT DOCUMENTS

| | | |
|---|---|---|
| JP | 2018-045845 A | 3/2018 |
| KR | 10-2014-0100071 A | 8/2014 |
| KR | 10-2019-0129487 A | 3/2016 |
| KR | 10-2019-0042401 A | 4/2019 |
| KR | 10-2016-0027847 A | 11/2019 |
| KR | 10-2020-0058067 A | 5/2020 |

* cited by examiner

ELECTRONIC DEVICE AND CONTROL METHOD THEREFOR

CROSS-REFERENCE TO RELATED APPLICATION(S)

This application is a continuation application, claiming priority under § 365(c), of an International application No. PCT/KR2022/000137, filed on Jan. 5, 2022, which is based on and claims the benefit of a Korean patent application number filed on Mar. 2, 2021, in the Korean Intellectual Property Office, the disclosure of which is incorporated by reference herein in its entirety.

BACKGROUND

1. Field

The disclosure relates to an electronic device and a control method therefor.

2. Description of Related Art

An electronic device may be connected with a charging device in a wired or wireless manner. The charging device may charge a battery of the electronic device. The charging device may supply power to the battery and an internal system of the electronic device when charging the battery.

The electronic device may receive the power supplied from the charging device. A power management module of the electronic device may deliver the power, supplied from the charging device, to the battery and the internal system. When the battery is fully charged, the power management module may stop delivering the power to the battery.

Meanwhile, the electronic device may include a temperature sensor which measures a temperature of the battery. A processor of the electronic device may measure a temperature of the battery using the temperature sensor while charging the battery. When the temperature of the battery, which is measured using the temperature sensor, is greater than or equal to a threshold temperature, the processor may reduce or cut off power delivered to the battery to control heating.

The above information is presented as background information only to assist with an understanding of the disclosure. No determination has been made, and no assertion is made, as to whether any of the above might be applicable as prior art with regard to the disclosure.

SUMMARY

When an electronic device is connected with a charging device in a wired manner, a power management module of the related art may deliver power to an internal system after a battery of the electronic device is fully charged. When the state where the power is delivered to the internal system is maintained even after the battery is fully charged, because the battery does not consume power after being fully charged, auxiliary charging of the battery may be reduced.

When the electronic device has a structure which is easy to radiate heat generated due to charging even when wirelessly connected with the charging device, the power management module of the related art may deliver power to the internal system after the battery is fully charged. For example, when the electronic device is a smartphone, the power management module may deliver power to the internal system after the battery is fully charged.

When the electronic device has a structure which is difficult to radiate heat generated due to charging while wirelessly charged, the power management module of the related art may stop delivering the power to the internal system after the battery is fully charged. For example, when the electronic device is a wearable device, the power management module may stop delivering the power to the internal system after the battery is fully charged. When delivering the power to the internal system of the electronic device is stopped after the battery is fully charged, auxiliary charging of the battery may frequently occur after the battery is fully charged. When the auxiliary charging of the battery frequently occurs, the lifetime of the battery may be reduced.

Aspects of the disclosure are to address at least the above-mentioned problems and/or disadvantages and to provide at least the advantages described below. Accordingly, an aspect of the disclosure is to provide a method for controlling reducing auxiliary charging of a battery after the battery is fully charged even when an electronic device has a structure which is difficult to radiate heat generated due to charging while the electronic device is wirelessly charged and an electronic device applying the method.

Additional aspects will be set forth in part in the description which follows and, in part, will be apparent from the description, or may be learned by practice of the presented embodiments.

In accordance with an aspect of the disclosure, an electronic device is provided. The electronic device includes a battery, a sensor module that obtains a first temperature which is a temperature of a first portion adjacent to the battery, a power reception unit that wirelessly receives from a charging device, a power management module that supplies the power to the battery and an internal system of the electronic device, and a processor electrically connected with the sensor module and the power management module. The processor may be configured to, while the electronic device wirelessly receives the power from the charging device, transmit a first command to the power management module such that the power management module cuts off the supply of the power to the battery and supplies the power to the internal system in response to that the battery is fully charged, obtain a second temperature which is a temperature of a second portion higher than the first portion in temperature sensitivity of a user of the electronic device using the sensor module, and control the power supplied to the internal system based on the second temperature.

In accordance with another aspect of the disclosure, a method of controlling an electronic device is provided. The method includes transmitting a first command to a power management module to cut off the supply of power to a battery and supply the power to an internal system in response to that the battery is fully charged, obtaining a second temperature which is a temperature of a second portion higher than a first portion adjacent to the battery in temperature sensitivity of a user of the electronic device using a sensor module, and controlling the power supplied to the internal system based on the second temperature.

According to embodiments disclosed in the disclosure, the electronic device may cut off power delivered to its battery and deliver power to its internal system after the battery is fully charged even when the electronic device has a structure which is difficult to radiate heat generated due to charging while wirelessly charged. Thus, the electronic device may reduce auxiliary charging of the battery after the battery is fully charged even when having the structure which is difficult to radiate the heat generated due to the heating while wirelessly charged.

Furthermore, according to embodiments disclosed in the disclosure, power delivered based on a temperature of a portion higher than the battery in temperature sensitivity of a user may be controlled. Thus, while power is delivered to the internal system, heating generated by the portion with high temperature sensitivity of the user may be controlled.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

Figure 1:
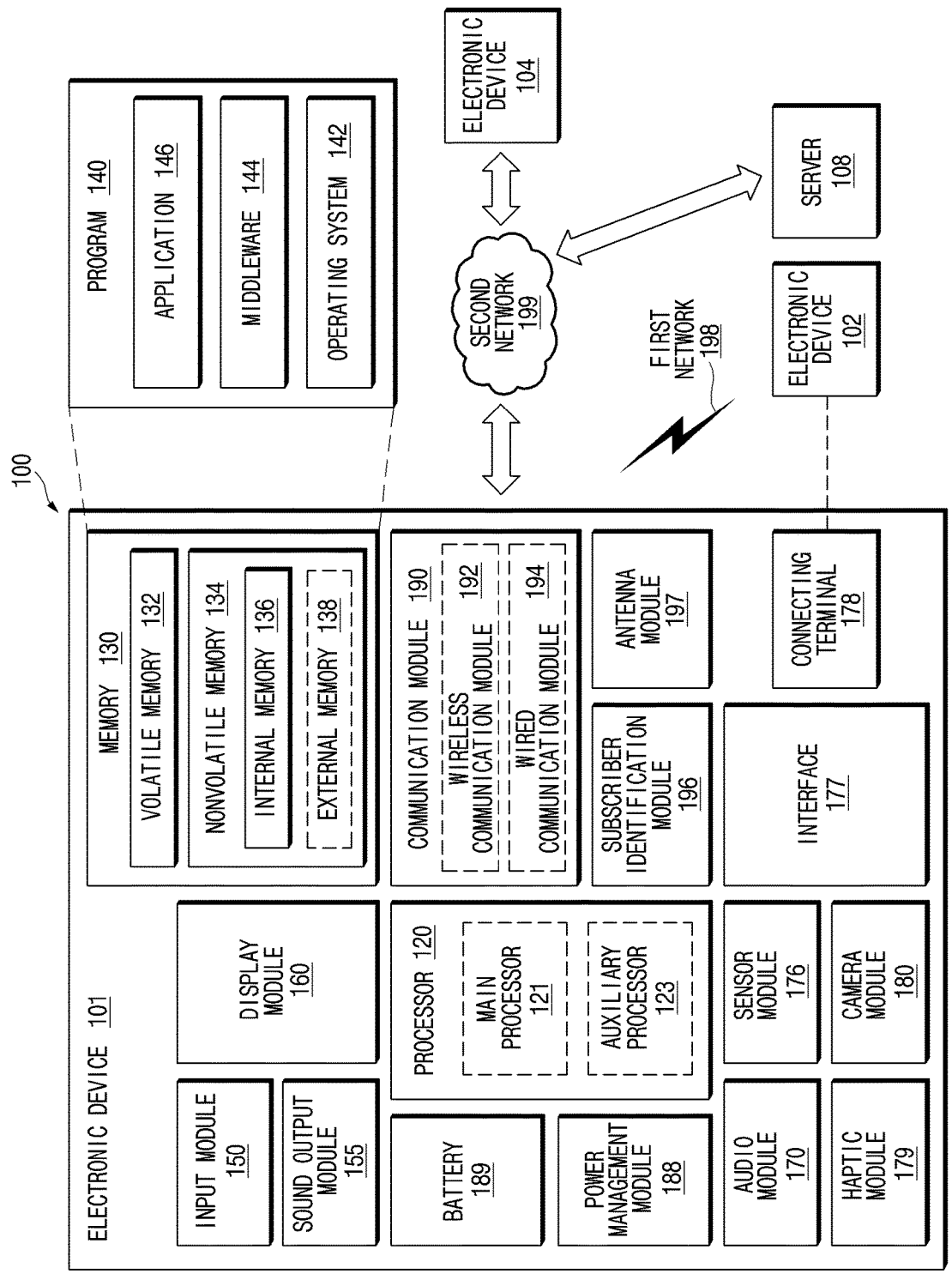
FIG. 1 is a block diagram illustrating an electronic device in a network environment according to an embodiment of the disclosure.

FIG. 1 is a block diagram illustrating an electronic device in a network environment according to an embodiment of the disclosure.

Referring to FIG. 1, an electronic device 101 in a network environment 100 may communicate with an external electronic device 102 via a first network 198 (e.g., a short-range wireless communication network), or at least one of an electronic device 104 or a server 108 via a second network 199 (e.g., a long-range wireless communication network). According to an embodiment of the disclosure, the electronic device 101 may communicate with the external electronic device 104 via the server 108. According to an embodiment of the disclosure, the electronic device 101 may include a processor 120, a memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, or an antenna module 197. In some embodiments of the disclosure, at least one of the components (e.g., the connecting terminal 178) may be omitted from the electronic device 101, or one or more other components may be added in the electronic device 101. In some embodiments of the disclosure, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to one embodiment of the disclosure, as at least part of the data processing or computation, the processor 120 may store a command or data received from another component (e.g., the sensor module 176 or the communication module 190) in a volatile memory 132, process the command or the data stored in the volatile memory 132, and store resulting data in a non-volatile memory 134. According to an embodiment of the disclosure, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment of the disclosure, the auxiliary processor 123 (e.g., an image signal processor or a communication processor) may be implemented as part of another component (e.g., the camera module 180 or the communication module 190) functionally related to the auxiliary processor 123. According to an embodiment of the disclosure, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment of the disclosure, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment of the disclosure, the display module 160 may include a touch sensor adapted to detect a touch, or a pressure sensor adapted to measure the intensity of force incurred by the touch.

The audio module 170 may convert a sound into an electrical signal and vice versa. According to an embodiment of the disclosure, the audio module 170 may obtain the sound via the input module 150, or output the sound via the sound output module 155 or a headphone of an external electronic device (e.g., the external electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment of the disclosure, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the external electronic device 102) directly (e.g., wiredly) or wirelessly. According to an embodiment of the disclosure, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the external electronic device 102). According to an embodiment of the disclosure, the connecting terminal 178 may include, for example, an HDMI connector, a USB connector, an SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 179 may include, for example, a motor, a piezoelectric element, or an electric stimulator.

The camera module 180 may capture a still image or moving images. According to an embodiment of the disclosure, the camera module 180 may include one or more lenses, image sensors, image signal processors, or flashes.

The power management module 188 may manage power supplied to the electronic device 101. According to one embodiment of the disclosure, the power management module 188 may be implemented as at least part of, for example, a power management integrated circuit (PMIC).

The battery 189 may supply power to at least one component of the electronic device 101. According to an embodiment of the disclosure, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the external electronic device 102, the external electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment of the disclosure, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5$^{th}$ generation (5G) network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4$^{th}$ generation (4G) network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the millimeter wave (mmWave) band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the external electronic device 104), or a network system (e.g., the second network 199). According to an embodiment of the disclosure, the wireless communication module 192 may support a peak data rate (e.g., 20 gigabits per second (Gbps) or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment of the disclosure, the antenna module 197 may include an antenna including a radiating element including a conductive material or a conductive pattern formed in or on a substrate (e.g., a printed circuit board (PCB)). According to an embodiment of the disclosure, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment of the disclosure, another component (e.g., a radio frequency integrated circuit (RFIC)) other than the radiating element may be additionally formed as part of the antenna module 197.

According to various embodiments of the disclosure, the antenna module 197 may form a mmWave antenna module.

According to an embodiment of the disclosure, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 101 and the external electronic device 104 via the server 108 coupled with the second network 199. Each of the external electronic devices 102 or 104 may be a device of a same type as, or a different type, from the electronic device 101. According to an embodiment of the disclosure, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In another embodiment of the disclosure, the external electronic device 104 may include an internet-of-things (IoT) device. The server 108 may be an intelligent server using machine learning and/or a neural network. According to an embodiment of the disclosure, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
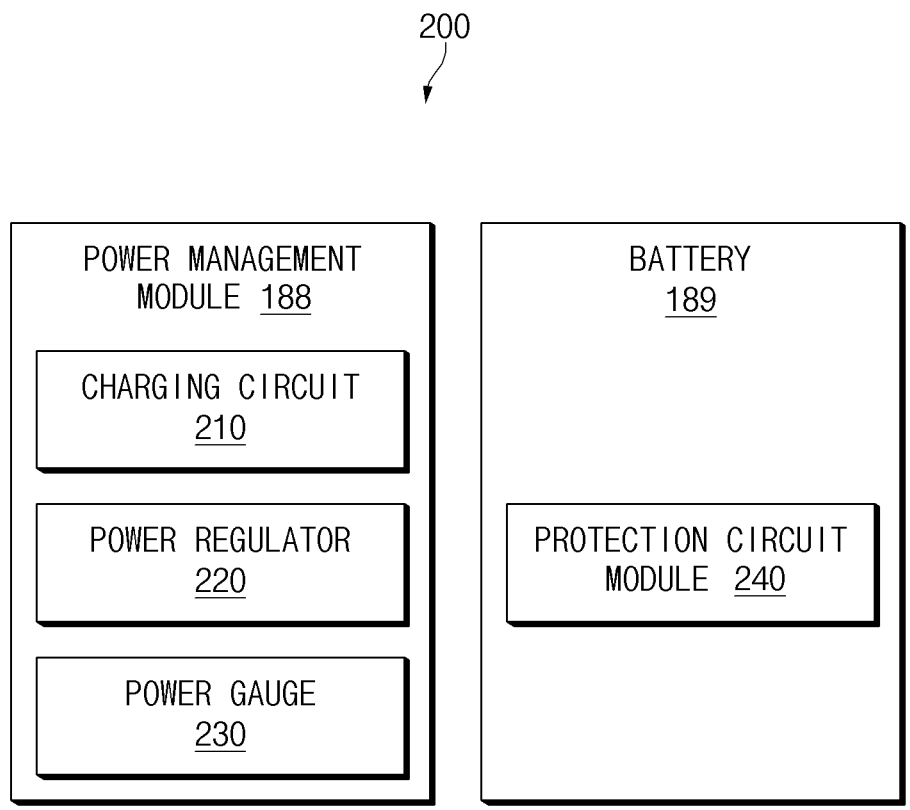
FIG. 2 is a block diagram of a power management module and a battery according to an embodiment of the disclosure.

FIG. 2 is a block diagram 200 of a power management module and a battery according to an embodiment of the disclosure.

Referring to FIG. 2, the power management module 188 may include a charging circuit 210, a power regulator 220, or a power gauge 230. The charging circuit 210 may charge the battery 189 using power supplied from an external power source for an electronic device 101. According to an embodiment of the disclosure, the charging circuit 210 may select a charging scheme (e.g., general charging or fast charging) based on at least some of a type (e.g., a power adaptor, a USB, or wireless charging) of the external power source, a magnitude (e.g., about 20 watts or more) of power capable of being supplied from the external power source, or properties of the battery 189 and may charge the battery 189 using the selected charging scheme. The external power source may be wiredly connected with the electronic device 101 through, for example, a connecting terminal 178 or may be wirelessly connected with the electronic device 101 through an antenna module 197.

The power regulator 220 may regulate a voltage level or a current level of the power supplied from the external power source or the battery 189 to generate a plurality of power having different voltage or current levels The power regulator 220 may regulate the power of the external power source or the battery 189 to a voltage or current level suitable for each of some of components included in the electronic device 101. According to an embodiment of the disclosure, the power regulator 220 may be implemented in the form of a low drop out (LDO) regulator or a switching regulator. The power gauge 230 may measure user state information about the battery 189 (e.g., a capacity of the battery 189, the number of times of charging and discharging the battery 189, a voltage of the battery 189, or a temperature of the battery 189).

For example, the power management module 188 may determine state of charge information (e.g., a lifetime, an over-voltage, a low voltage, an over-current, overcharging, over discharge, over-heating, a short circuit, or swelling) associated with charging the battery 189 based on at least a portion of the measured use state information, using the charging circuit 210, the power regulator 220, or the fuel gauge 230. The power management module 188 may determine whether the battery 189 is normal or abnormal, based on at least a portion of the determined state of charge information. When the state of the battery 189 is determined as being abnormal, the power management module 188 may adjust charging (e.g., reduce a charging current or voltage or stop charging) for the battery 189. According to an embodiment of the disclosure, at least some of functions of the power management module 188 may be performed by an external control device (e.g., a processor 120).

According to an embodiment of the disclosure, the battery 189 may include a protection circuit module (PCM) 240. The PCM 240 may perform one or more of various functions (e.g., a pre-cutoff function) for preventing the battery 189 from deteriorating in performance or burning. Additionally or alternatively, the PCM 240 may be implemented as at least a part of a battery management system (BMS) capable of performing various functions including cell balancing, battery capacity measurement, charging/discharging count measurement, temperature measurement, or voltage measurement.

According to an embodiment of the disclosure, at least a portion of the use state information or the state of charge information of the battery 189 may be measured using a corresponding sensor (e.g., a temperature sensor) in a sensor module 176, the power gauge 230, or the power management module 188. According to an embodiment of the disclosure, the corresponding sensor (e.g., the temperature sensor) in the sensor module 176 may be included as a part of the PCM 240 or may be a device independently of it to be disposed near the battery 189.

Figure 3:
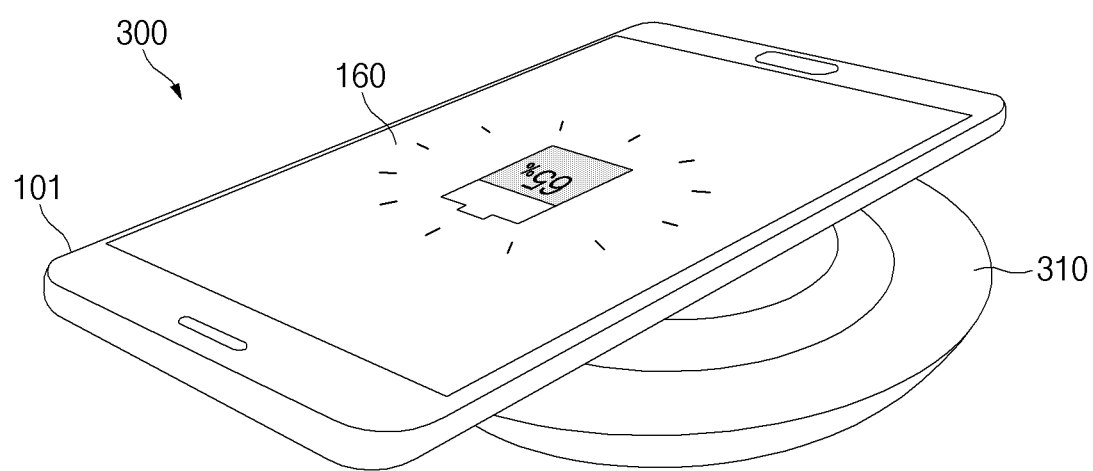
FIG. 3 is a drawing illustrating wirelessly charging an electronic device according to an embodiment of the disclosure.

FIG. 3 is a drawing 300 illustrating wirelessly charging an electronic device according to an embodiment of the disclosure.

Referring to FIG. 3, the electronic device 101 may be located adjacent to a charging device 310. For example, the electronic device 101 may be located on a charging pad of the charging device 310. A charging coil may be disposed in the charging pad.

The charging device 310 may wirelessly supply power using the charging coil. The electronic device 101 may wirelessly receive power from the charging device 310. The electronic device 101 may charge a battery (e.g., the battery 189 of FIG. 2) using the power supplied from the charging device 310.

The electronic device 101 may display a state of charge on a display module 160 while charged. For example, the electronic device 101 may display a ratio of a capacity where the battery 189 is charged compared to a full capacity of the battery 189 on the display module 160.

The electronic device 101 may have a structure capable of easily radiating heat generated from wireless charging. For example, when the electronic device 101 is a smartphone, it may radiate heat generated from wireless charging through a front surface, a side surface, and a back surface except for a surface which is in contact with the charging device 310 among the surfaces of the electronic device 101.

A power management module (e.g., the power management module 188 of FIG. 2) of the electronic device 101 may stop delivering power to the battery 189 after the battery 189 is fully charged. After the battery 189 is fully charged, the power management module 188 may deliver power to an internal system of the electronic device 101. When the state where the power is delivered to the internal system is maintained even after the battery 189 is fully charged, because the battery 189 does not consume power after being fully charged, auxiliary charging of the battery 189 may be reduced.

Figure 4:
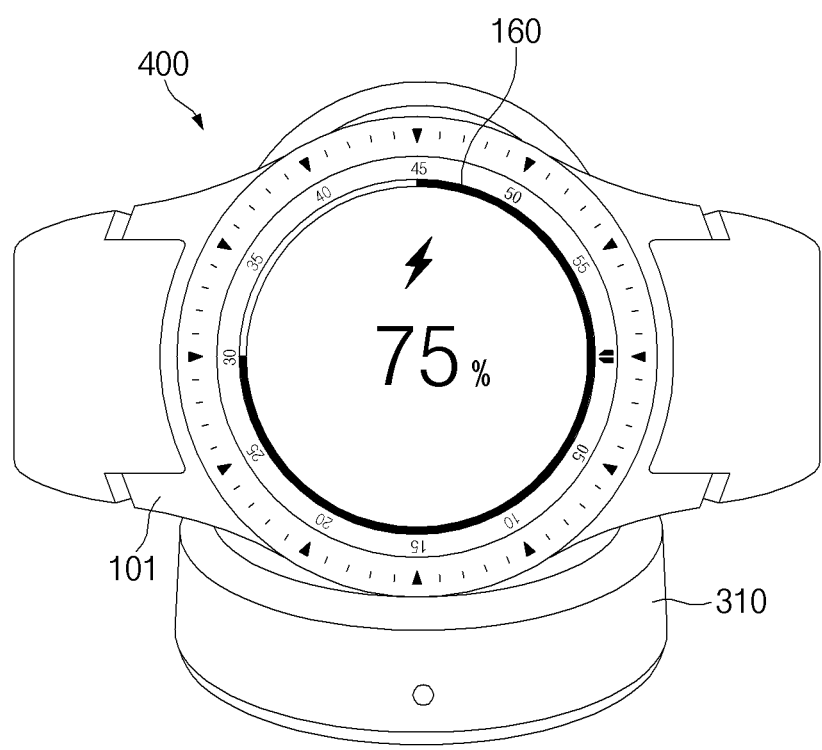
FIG. 4 is a drawing illustrating wirelessly charging an electronic device according to an embodiment of the disclosure.

FIG. 4 is a drawing 400 illustrating wirelessly charging an electronic device according to an embodiment of the disclosure.

Referring to FIG. 4, the electronic device 101 may be located adjacent to a charging device 310. For example, the electronic device 101 may be located on a stand of the charging device 310. A charging coil may be disposed in the stand.

The charging device 310 may wirelessly supply power using the charging coil. The electronic device 101 may wirelessly receive power from the charging device 310. The electronic device 101 may charge a battery (e.g., a battery 189 of FIG. 2) using the power supplied from the charging device 310.

The electronic device 101 may display a state of charge on a display module 160 while charged. For example, the electronic device 101 may display a charged capacity compared to a full capacity of the battery 189 on the display module 160.

The electronic device 101 may have a structure which is difficult to radiate heat generated from wireless charging. For example, when the electronic device 101 is a wearable device, such as a smart watch, it may be difficult to radiate heat generated from wireless charging.

When the electronic device 101 is difficult to radiate heat generated from wireless charging, a power management module (e.g., a power management module 188 of FIG. 2) of the electronic device 101 may stop delivering power to an internal system of the electronic device 101 after the battery 189 is fully charged. When delivering the power to the internal system of the electronic device 101 is stopped after the battery 189 is fully charged, auxiliary charging of the battery 189 may frequently occur after the battery 189 is fully charged. When the auxiliary charging of the battery 189 frequently occurs, the lifetime of the battery 189 may be reduced.

The disclosure is to provide a control method for reducing auxiliary charging of the battery 189 after the battery 189 is fully charged even when the electronic device 101 has a structure which is difficult to radiate heat generated from wireless charging and the electronic device 101 applying the method.

Figure 5:
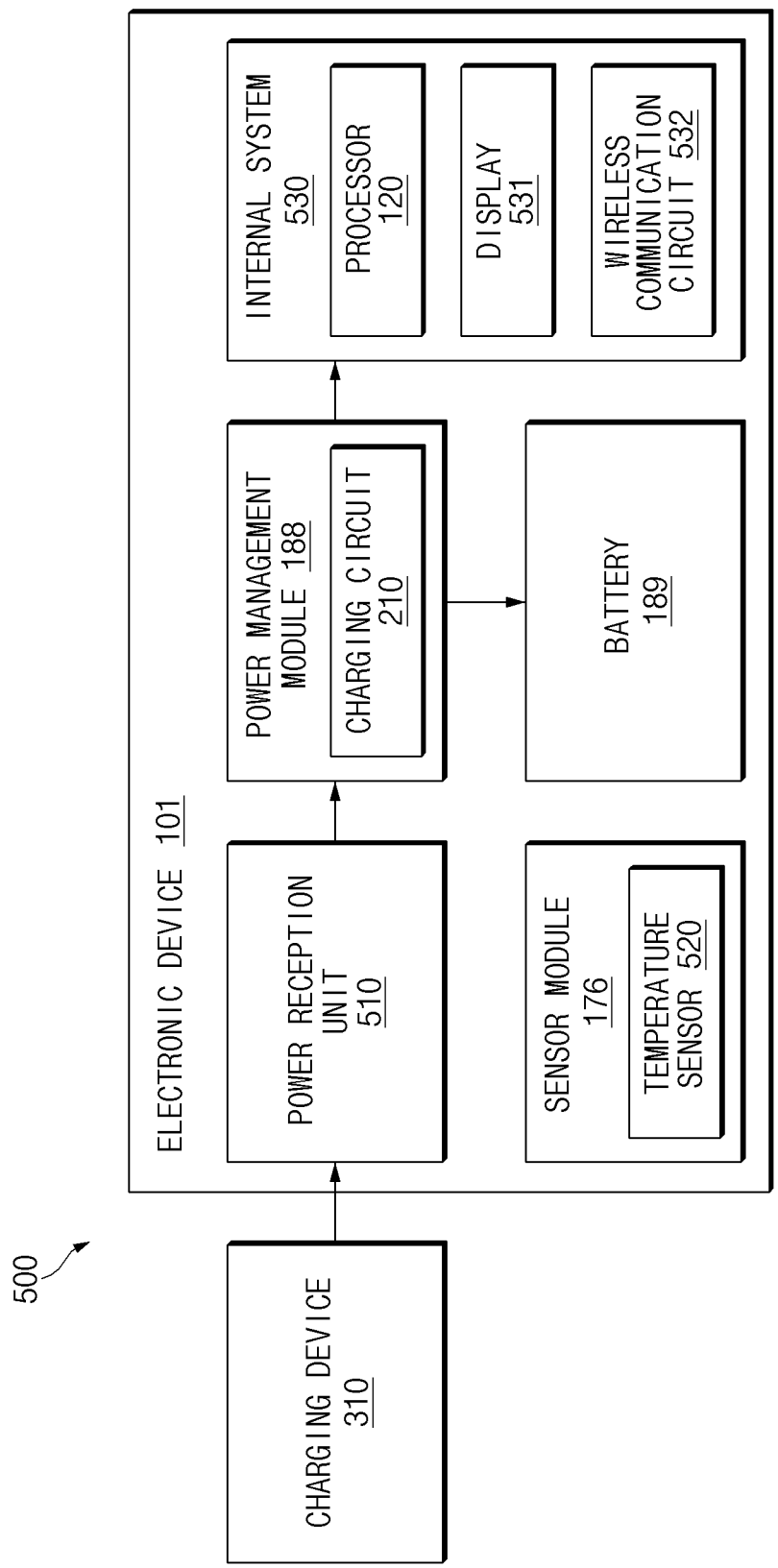
FIG. 5 is a block diagram illustrating an electronic device and a charging device according to an embodiment of the disclosure.

FIG. 5 is a block diagram 500 illustrating an electronic device and a charging device according to an embodiment of the disclosure.

Referring to FIG. 5, in an embodiment of the disclosure, the electronic device 101 may be located adjacent to the charging device 310. The electronic device 101 may be located on a charging part of the charging device 310. For example, the charging part may be a charging pad. For another example, the charging part may be a stand.

In an embodiment of the disclosure, a charging coil may be disposed on the charging part of the charging device 310. The charging device 310 may wirelessly supply power using the charging coil.

In an embodiment of the disclosure, the electronic device 101 may include a power reception unit 510, a power management module 188, a battery 189, a sensor module 176, and an internal system 530.

In an embodiment of the disclosure, the power reception unit 510 may wirelessly receive power from the charging device 310. For example, the power reception unit 510 may be a receive (RX) integrated circuit (IC). The power reception unit 510 may deliver power, received from the charging device 310, to the power management module 188. The power reception unit 510 may convert and deliver the power received from the charging device 310 into a magnitude capable of being controlled by the power management module 188.

In an embodiment of the disclosure, the power management module 188 may distribute power supplied to the electronic device 101 using the power received from the power reception unit 510. The power management module 188 may supply the power, received from the power reception unit 510, to the battery 189. The power management module 188 may include a charging circuit 210. The charging circuit 210 may deliver the power, received from the power reception unit 510, to the battery 189. The charging circuit 210 may charge the battery 189 using the power supplied from the charging device 310. The power management module 188 may supply the power, received from the power reception unit 510, to the internal system 530.

In an embodiment of the disclosure, the sensor module 176 may include a temperature sensor 520. The temperature sensor 520 may be a thermistor. The sensor module 176 may obtain a first temperature which is a temperature of a first portion using the temperature sensor 520. The first portion may be a portion adjacent to the battery 189. The first temperature may be a temperature of the battery 189.

In an embodiment of the disclosure, the internal system 530 may include at least one module in the electronic device 101. The internal system 530 may include a processor 120, a display 531 (e.g., a display module 160 of FIG. 4), a wireless communication circuit 532 (e.g., a wireless communication module 192 of FIG. 1). For example, the internal system 530 may further include a camera (e.g., a camera module 180 of FIG. 1) and a speaker (e.g., a sound output module 155 of FIG. 1). The internal system 530 may receive power from the power management module 188. The internal system 530 may operate using the power supplied from the power management module 188.

In an embodiment of the disclosure, the processor 120 may be electrically connected with the sensor module 176 and the power management module 188.

In an embodiment of the disclosure, while the electronic device 101 is connected with the charging device 310, the processor 120 may receive the first temperature from the sensor module 176. The processor 120 may control the charging circuit 210 of the power management module 188 to control power supplied to the battery 189 based on the first temperature. The processor 120 may control the charging circuit 210 to reduce power supplied to the battery 189 in response to that the first temperature is greater than or equal to a first threshold temperature. The processor 120 may control the charging circuit 210 to cut off power supplied to the battery 189 in response to that the first temperature is greater than or equal to a second threshold temperature. The second threshold temperature may be a temperature higher than the first threshold temperature.

In an embodiment of the disclosure, while the electronic device 101 is connected with the charging device 310, the processor 120 may receive first data from the power management module 188. The first data may include information associated with a state of charge of the battery 189. For example, the information associated with the state of charge of the battery 189 may include a ratio of a capacity where the battery 189 is charged compared to a full capacity of the battery 189.

In an embodiment of the disclosure, while the electronic device 101 is connected with the charging device 310, the processor 120 may identify whether the full capacity of the battery 189 and the capacity where the battery 189 is charged are substantially the same as each other based on the first data. For example, when the full capacity of the battery 189 and the capacity where the battery 189 is charged are substantially the same as each other, the processor 120 may determine that the battery 189 is fully charged. For another example, the power management module 188 may determine whether the full capacity of the battery 189 and the capacity where the battery 189 is charged are substantially the same as each other to determine whether the battery 189 is fully charged. In this case, when determining that the battery 189 is fully charged, the power management module 188 may notify the processor 120 of an event that the battery 189 is fully charged.

In an embodiment of the disclosure, while the electronic device 101 is connected with the charging device 310, the processor 120 may transmit a first command to the power management module 188 in response to that the battery 189 is fully charged. The first command may allow the power management module 188 to cut off the supply of power to the battery 189. The first command may allow the power management module 188 to supply power to the internal system 530. For example, the processor 120 may transmit the first command to the power management module 188 such that the charging circuit 210 of the power management module 188 cuts off a first power supply path to supply power to the battery 189 and maintains a second power supply path to supply power to the internal system 530. For another example, the processor 120 may transmit the first command to the power management module 188 such that the charging circuit 210 of the power management module 188 turns off a first switch for controlling the supply of power to the battery 189 and turns on a second switch for controlling the supply of power to the internal system 530.

In an embodiment of the disclosure, while the electronic device 101 is connected with the charging device 310, the processor 120 may obtain a second temperature which is a temperature of a second portion using the sensor module 176. The processor 120 may control the sensor module 176 to change a portion where the sensor module 176 obtains a temperature using the temperature sensor 520 from the first portion to the second portion. The second portion may be a portion which is higher than the first portion in temperature sensitivity of a user of the electronic device 101. The second portion may be a portion which is higher than a portion adjacent to the battery 189 in the temperature sensitivity of the user. The portion with the high temperature sensitivity of the user may be a portion which is easily in contact with the user of the electronic device 101. For example, the second portion may be a rear portion of the electronic device 101, which is more easily in contact with the user than the first portion adjacent to the battery 189.

In an embodiment of the disclosure, when the electronic device 101 is a wearable device, the second portion may be a portion which is in contact with a body of the user when the user wears the electronic device 101. In an embodiment of the disclosure, when the electronic device 101 is a smart watch, the second portion may be a portion adjacent to a rear housing and a rear electrode, which are in contact with a wrist of the user when the user wears the electronic device 101. For another example, when the electronic device 101 is earbuds, the second portion may be earbud bodies and an external surface of an earbud case, which are in contact with ears and a hand of the user when the user wears the electronic device 101.

In an embodiment of the disclosure, the processor 120 may be configured to, while the electronic device 101 is connected with the charging device 310, control power supplied to the internal system 530 based on the second temperature. The processor 120 may control the power management module 188 to control power supplied to the internal system 530 based on the second temperature. The processor 120 may control the power management module 188 to reduce power supplied to the internal system 530 in response to that the second temperature is greater than or equal to a first threshold temperature. The processor 120 may control the power management module 188 to cut off power supplied to the internal system 530 in response to that the first temperature is greater than or equal to a second threshold temperature. The second threshold temperature may be a temperature higher than the first threshold temperature.

Figure 6:
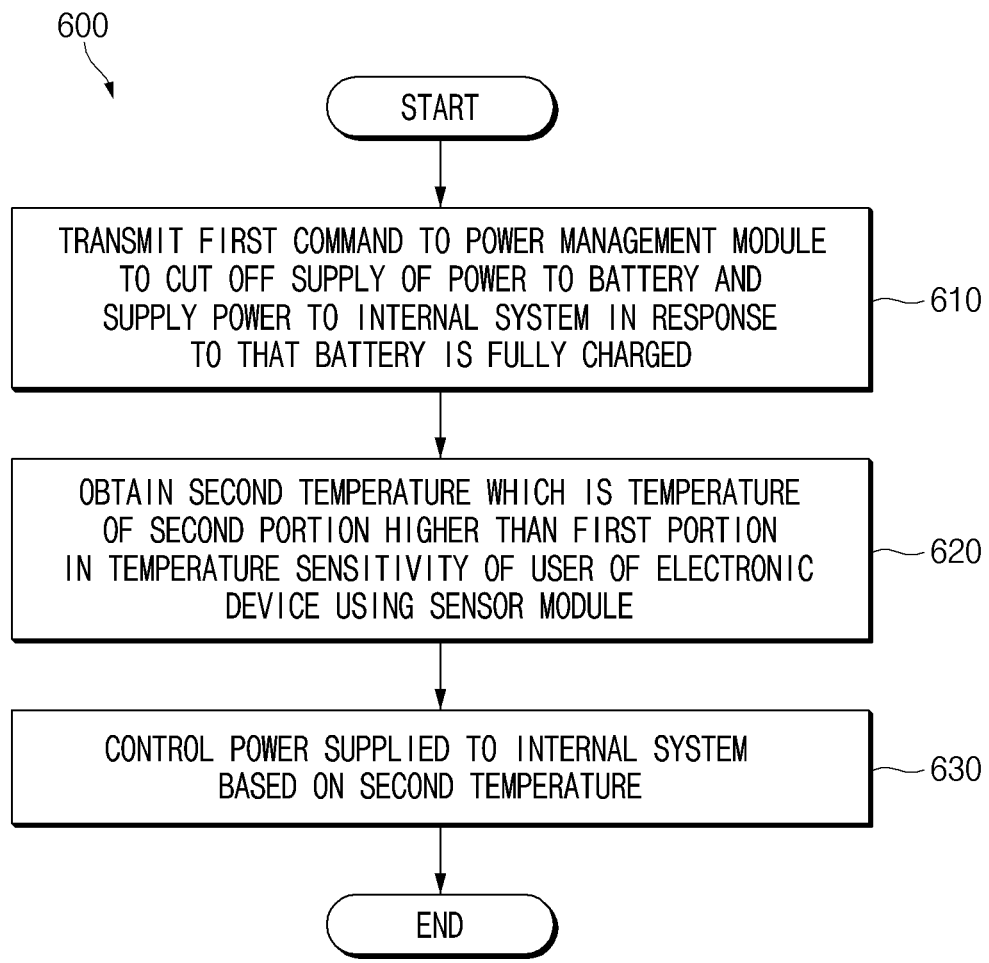
FIG. 6 is a flowchart illustrating a method of controlling an electronic device according to an embodiment of the disclosure.

FIG. 6 is a flowchart 600 illustrating a control method of an electronic device according to an embodiment of the disclosure.

Referring to FIG. 6, in operation 610, a processor (e.g., a processor 120 of FIG. 5) of the electronic device 101 according to an embodiment may transmit a first command to a power management module (e.g., a power management module 188 of FIG. 5) to cut off the supply of power to a battery (e.g., a battery 189 of FIG. 5) and supply power to an internal system (e.g., an internal system 530 of FIG. 5) in response to that the battery 189 is fully charged. When the battery 189 is fully charged, the processor 120 may cut off the supply of power to the battery 189 to reduce heat generated by the battery 189. Even when the battery 189 is fully charged, the processor 120 may supply power to the internal system 530 to reduce a phenomenon where the battery 189 consumes the power. The processor 120 may reduce the phenomenon where the battery 189 consumes power after being fully charged to reduce auxiliary charging of the battery 189. The processor 120 may decrease the auxiliary charging of the battery 189 to increase the lifetime of the battery 189.

In operation 620, the processor 120 of the electronic device 101 according to an embodiment may obtain a second temperature which is a temperature of a second portion higher than a first portion in temperature sensitivity of a user of the electronic device 101 using a sensor module (e.g., a sensor module 176 of FIG. 5). The first portion may be a portion adjacent to the battery 189. The second portion may be a portion higher than the portion adjacent to the battery 189 in the temperature sensitivity of the user. The processor 120 may control the sensor module 176 to obtain a temperature of a portion where the user more sensitively detects heat generated by the internal system 530 when supplying power to the internal system 530 after the battery 189 is fully charged.

In operation 630, the processor 120 of the electronic device 101 according to an embodiment may control power supplied to the internal system 530 based on the second temperature. The processor 120 may control the power management module 188 to reduce power supplied to the internal system 530 in response to that the second temperature is greater than or equal to a first threshold temperature. The processor 120 may control the power management module 188 to cut off power supplied to the internal system 530 in response to that a first temperature is greater than or equal to a second threshold temperature. The processor 120 may control the power management module 188 based on the temperature of the second portion and may perform heating control while power is supplied to the internal system 530 after being fully charged.

Figure 7:
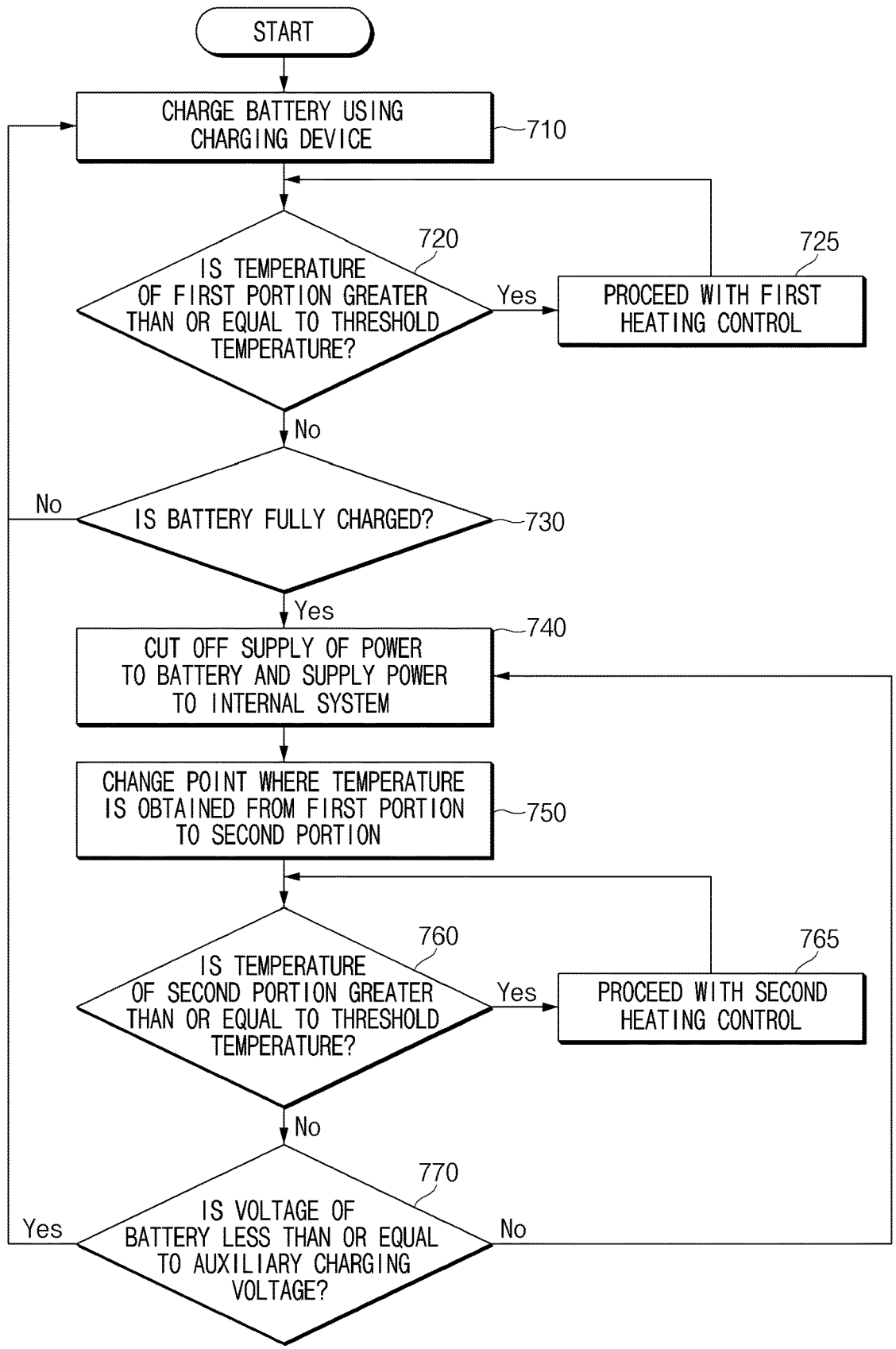
FIG. 7 is a flowchart illustrating a method of controlling an electronic device according to an embodiment of the disclosure.

FIG. 7 is a flowchart 700 illustrating a control method of an electronic device according to an embodiment of the disclosure.

Referring to FIG. 7, in operation 710, the electronic device 101 according to an embodiment may charge a battery (e.g., a battery 189 of FIG. 5) using a charging device (e.g., a charging device 310 of FIG. 5). A power reception unit (e.g., a power reception unit 510 of FIG. 5) of the electronic device 101 may wirelessly receive power from the charging device 310.

In operation 720, a processor (e.g., a processor 120 of FIG. 5) of the electronic device 101 according to an embodiment may identify whether a temperature of a first portion is greater than or equal to a threshold temperature using a sensor module (e.g., a sensor module 176 of FIG. 5). The first portion may be a portion adjacent to the battery 189. The temperature of the first portion may be a temperature of the battery 189. The sensor module 176 may measure the temperature of the first portion using a temperature sensor (e.g., a temperature sensor 520 of FIG. 5). The processor 120 may identify whether the measured temperature of the first portion is greater than or equal to the threshold temperature. For example, after determining whether the temperature of the first portion is greater than or equal to a first threshold temperature, when the temperature of the first portion is greater than or equal to the first threshold temperature, the processor 120 may additionally determine whether the temperature of the first portion is greater than or equal to a second threshold temperature. When the temperature of the first portion is greater than or equal to the threshold temperature (operation 720—Yes), the processor 120 may proceed to operation 725. When the temperature of the first portion is less than the threshold temperature (operation 720—No), the processor 120 may proceed to operation 730.

In operation 725, the processor 120 of the electronic device 101 according to an embodiment may proceed with first heating control. The processor 120 may control a charging circuit (e.g., a charging circuit 210 of FIG. 5) of a power management module (e.g., a power management module 188 of FIG. 5) to control power supplied to the battery 189 based on a first temperature which is the temperature of the first portion. The processor 120 may control the charging circuit 210 to reduce power supplied to the battery 189 in response to that the first temperature is greater than or equal to the first threshold temperature. The processor 120 may control the charging circuit 210 to cut off power supplied to the battery 189 in response to that the first temperature is greater than or equal to the second threshold temperature. The second threshold temperature may be a temperature higher than the first threshold temperature. The processor 120 may control power supplied from the power management module 188 to control the temperature of the battery 189 to a temperature lower than the threshold temperature.

In operation 730, the processor 120 of the electronic device 101 according to an embodiment may identify whether the battery 189 is fully charged. The processor 120 may receive first data including information associated with a state of charge from the power management module 188. While the electronic device 101 is connected with the charging device 310, the processor 120 may identify whether a full capacity of the battery 189 and a capacity where the battery 189 is charged are substantially the same as each other based on the first data. When the full capacity of the battery 189 and the capacity where the battery 189 is charged are substantially the same as each other, the processor 120 may determine that the battery 189 is fully charged. When the battery 189 is fully charged (operation 730—Yes), the processor 120 may proceed to operation 740. When the battery 189 is not fully charged (operation 730—No), the processor 120 may return to operation 710.

In operation 740, the power management module 188 of the electronic device 101 according to an embodiment may cut off the supply of power to the battery 189 and may supply power to an internal system (e.g., an internal system 530 of FIG. The processor 120 may transmit a first command to the power management module 188 in response to that the battery 189 is fully charged. The first command may allow the power management module 188 to cut off the supply of power to the battery 189. The first command may allow the power management module 188 to supply power to the internal system 530.

In operation 750, the processor 120 of the electronic device 101 according to an embodiment may change a point where a temperature is obtained from a first portion to a second portion. The processor 120 may control the sensor module 176 to change a portion where the sensor module 176 obtains a temperature using the temperature sensor 520 from the first portion to the second portion. The second portion may be a portion which is higher than the first portion in temperature sensitivity of a user of the electronic device 101. The second portion may be a portion which is higher than a portion adjacent to the battery 189 in the temperature sensitivity of the user.

In operation 760, the processor 120 of the electronic device 101 according to an embodiment may identify whether a temperature of the second portion is greater than or equal to the threshold temperature. The first portion may be a portion adjacent to the battery 189. The temperature of the second portion may be a temperature of a portion which is higher than the portion adjacent to the battery 189 in the temperature sensitivity of the user. The sensor module 176 may measure the temperature of the second portion using the temperature sensor 520. The processor 120 may identify whether the measured temperature of the second portion is greater than or equal to the threshold temperature. For example, after determining whether the temperature of the second portion is greater than or equal to the first threshold temperature, when the temperature of the second portion is greater than or equal to the first threshold temperature, the processor 120 may additionally determine whether the temperature of the second portion is greater than or equal to the second threshold temperature. When the temperature of the second portion is greater than or equal to the threshold temperature (operation 760—Yes), the processor 120 may proceed to operation 765. When the temperature of the second portion is less than the threshold temperature (operation 760—No), the processor 120 may proceed to operation 770.

In operation 765, the processor 120 of the electronic device 101 according to an embodiment may proceed with second heating control. The temperature sensor 520 may measure a second temperature which is the temperature of the second portion. The power management module 188 may control power supplied to the battery 189 based on the second temperature. The processor 120 may control the power management module 188 to control power supplied to the battery 189. The processor 120 may control the power management module 188 to reduce power supplied to the internal system 530 in response to that the second temperature is greater than or equal to the first threshold temperature. The processor 120 may control the power management module 188 to cut off power supplied to the internal system 530 in response to that the second temperature is greater than or equal to the second threshold temperature. The second threshold temperature may be a temperature higher than the first threshold temperature. The processor 120 may control power supplied from the power management module 188 to the internal system 530 to control the temperature of the second portion to a temperature lower than the threshold temperature.

In operation 770, the processor 120 of the electronic device 101 according to an embodiment may determine whether the voltage of the battery 189 is less than or equal to an auxiliary charging voltage. The auxiliary charging voltage may be a voltage of the battery 189 where auxiliary charging should be performed in the battery 189. The processor 120 may determine whether the voltage of the battery 189 is less than or equal to the auxiliary charging voltage based on the first data. When the voltage of the battery 189 is less than or equal to the auxiliary charging voltage (operation 770—Yes), the processor 120 may return to operation 710. When the voltage of the battery 189 is greater than the auxiliary charging voltage (operation 770—No), the processor 120 may return to operation 740.

In an embodiment of the disclosure, the processor 120 may cut off only power input to the battery 189 and may continue supplying power to the internal system 530 after the electronic device 101 is fully charged to prevent frequent auxiliary charging of the battery 189 after the electronic device 101 is fully charged even when the electronic device 101 has a structure which is difficult to radiate heat generated due to charging while the electronic device 101 is wirelessly charged. Because power is not supplied to the battery 189 and is supplied to only the internal system 530 after it is fully charged, the temperature of the battery 189 may not increase after it is fully charged.

In an embodiment of the disclosure, after it is fully charged, the processor 120 may change a point where a temperature is managed from the battery 189 to another place. After it is fully charged, the processor 120 may change the point where the temperature is managed to a portion which is easy for a user to feel heating.

In an embodiment of the disclosure, the processor 120 may control power supplied to the internal system 530 based on a temperature of the point where the temperature is managed after it is fully charged. Thus, even when the electronic device 101 has a structure which is difficult to radiate heat generated due to charging, the processor 120 may perform heating control while minimizing auxiliary charging after it is fully charged.

The electronic device according to various embodiments may be one of various types of electronic devices. The electronic devices may include, for example, a portable communication device (e.g., a smartphone), a computer device, a portable multimedia device, a portable medical device, a camera, a wearable device, or a home appliance. According to an embodiment of the disclosure, the electronic devices are not limited to those described above.

It should be appreciated that various embodiments of the disclosure and the terms used therein are not intended to limit the technological features set forth herein to particular embodiments and include various changes, equivalents, or replacements for a corresponding embodiment. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "$1^{st}$" and "$2^{nd}$," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), it means that the element may be coupled with the other element directly (e.g., wiredly), wirelessly, or via a third element.

As used in connection with various embodiments of the disclosure, the term "module" may include a unit implemented in hardware, software, or firmware, and may interchangeably be used with other terms, for example, "logic," "logic block," "part," or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 140) including one or more instructions that are stored in a storage medium (e.g., an internal memory 136 or an external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a complier or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., a compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities, and some of the multiple entities may be separately disposed in different components. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device comprising:
   a battery;
   a sensor module configured to obtain a first temperature which is a temperature of a first portion adjacent to the battery;
   a power reception unit configured to wirelessly receive power from a charging device;
   a power management module configured to supply the power to the battery and an internal system of the electronic device; and
   at least one processor electrically connected with the sensor module and the power management module,
   wherein the at least one processor is configured to:
   while the electronic device wirelessly receives the power from the charging device, transmit a first command to the power management module such that the power management module cuts off the supply of the power to the battery and supplies the power to the internal system in response to that the battery is fully charged, obtain a second temperature which is a temperature of a second portion using the sensor module, and control the power supplied to the internal system based on the second temperature, and wherein the second portion is a rear portion of the electronic device or a portion which is in contact with a body of a user.

2. The electronic device of claim 1, wherein the internal system includes the processor, a display, and a wireless communication circuit.

3. The electronic device of claim 2, wherein the internal system further includes a camera and a speaker.

4. The electronic device of claim 1, wherein the at least one processor is further configured to:

receive first data including information associated with a state of charge of the battery from the power management module;

identify whether a full capacity of the battery and a capacity where the battery is charged are substantially the same as each other based on the first data; and determine that the battery is fully charged, when the full capacity of the battery and the capacity where the battery is charged are substantially the same as each other.

5. The electronic device of claim 1, wherein the at least one processor is further configured to:

transmit the first command to the power management module such that a charging circuit of the power management module cuts off a first power supply path to supply the power to the battery and maintains a second power supply path to supply the power to the internal system.

6. The electronic device of claim 1, wherein the at least one processor is further configured to:

transmit the first command to the power management module such that a charging circuit of the power management module turns off a first switch for controlling the supply of power to the battery and turns on a second switch for controlling the supply of the power to the internal system.

7. The electronic device of claim 1, wherein the at least one processor is further configured to:

decrease the power supplied to the internal system in response to that the second temperature is greater than or equal to a first threshold temperature.

8. The electronic device of claim 7, wherein the at least one processor is further configured to:

cut off the power supplied to the internal system in response to that the second temperature is greater than or equal to a second threshold temperature higher than the first threshold temperature.

9. A method of controlling an electronic device, the method comprising:

transmitting a first command to a power management module to cut off supply of power to a battery and supply the power to an internal system in response to that the battery is fully charged;

obtaining a first temperature which is a temperature of a first portion adjacent to the battery;

obtaining a second temperature which is a temperature of a second portion using a sensor module; and controlling the power supplied to the internal system based on the second temperature, wherein the second portion is a rear portion of the electronic device or a portion which is in contact with a body of a user.

10. The method of claim 9, wherein the internal system further includes a processor, a display, and a wireless communication circuit.

11. The method of claim 10, wherein the internal system further includes a camera and a speaker.

12. The method of claim 9, further comprising:

before transmitting the first command, receiving first data including information associated with a state of charge of the battery from the power management module;

identifying whether a full capacity of the battery and a capacity where the battery is charged are substantially the same as each other based on the first data; and determining that the battery is fully charged, when the full capacity of the battery and the capacity where the battery is charged are substantially the same as each other.

13. The method of claim 9, wherein the transmitting of the first command includes:

transmitting the first command to the power management module such that a charging circuit of the power management module cuts off a first power supply path to supply the power to the battery and maintain a second power supply path to supply the power to the internal system.

14. The method of claim 9, wherein the transmitting of the first command includes:

transmitting the first command to the power management module such that a charging circuit of the power management module turns off a first switch for controlling the supply of power to the battery and turns on a second switch for controlling the supply of the power to the internal system.

15. The method of claim 9, further comprising:

decreasing the power supplied to the internal system in response to that the second temperature is greater than or equal to a first threshold temperature.

16. The method of claim 15, further comprising:

cutting off the power supplied to the internal system in response to that the second temperature is greater than or equal to a second threshold temperature higher than the first threshold temperature.

* * * * *